US010358112B2

(12) United States Patent
Fulcher

(10) Patent No.: US 10,358,112 B2
(45) Date of Patent: Jul. 23, 2019

(54) IMMOBILIZER DEVICE FOR A WHEEL

(71) Applicant: MITI Manufacturing Company, Grand Junction, CO (US)

(72) Inventor: Robert A. Fulcher, Grand Junction, CO (US)

(73) Assignee: MITI Manufacturing Company, Grand Junction, CO (US)

( * ) Notice: Subject to any disclaimer, the term of this patent is extended or adjusted under 35 U.S.C. 154(b) by 9 days.

(21) Appl. No.: 15/199,232

(22) Filed: Jun. 30, 2016

(65) Prior Publication Data
US 2017/0001597 A1    Jan. 5, 2017

Related U.S. Application Data

(60) Provisional application No. 62/186,802, filed on Jun. 30, 2015.

(51) Int. Cl.
*B60R 25/00* (2013.01)
*B60R 25/09* (2013.01)

(52) U.S. Cl.
CPC ................... *B60R 25/093* (2013.01)

(58) Field of Classification Search
CPC ......... B60R 25/00; B60R 25/09; B60R 25/20; B60R 25/093
USPC ............................................ 180/287; 188/32
See application file for complete search history.

(56) References Cited

U.S. PATENT DOCUMENTS

| 1,503,210 | A | * | 7/1924 | Shannon | B60R 25/093 70/18 |
| RE24,712 | E | | 10/1959 | Marugg | |
| 2,942,452 | A | * | 6/1960 | Marchese | E05B 15/08 70/408 |
| 2,960,857 | A | | 11/1960 | Winter | |
| 3,754,418 | A | * | 8/1973 | Miller | E05B 71/00 70/18 |
| 3,868,837 | A | * | 3/1975 | Quimby | B60R 25/093 70/18 |
| 3,924,426 | A | * | 12/1975 | Zane | E05B 71/00 70/18 |
| 4,024,604 | A | * | 5/1977 | Klimek | F16L 3/223 24/16 R |
| 4,136,539 | A | * | 1/1979 | Nobles | E05B 67/003 70/18 |
| 5,832,760 | A | * | 11/1998 | Firmin | B60R 25/093 70/226 |
| 5,865,048 | A | | 2/1999 | Beavers et al. | |
| 7,032,416 | B1 | * | 4/2006 | Wu | B60R 25/093 70/19 |
| 7,428,833 | B2 | * | 9/2008 | Tollefson | B60D 1/60 70/14 |

(Continued)

*Primary Examiner* — Suzanne L Barrett
(74) *Attorney, Agent, or Firm* — Sheridan Ross P.C.

(57) ABSTRACT

An immobilizer device is provided for preventing the travel of a wheel, particularly the wheel of a vehicle. The immobilizer device utilizes an elongated pin to pass through a portion or aperture of the wheel, and the immobilizer device prevents travel of the wheel by acting as a chock. Some embodiments of the immobilizer device comprise an indexing feature to guide the elongated pin into an aperture and a receiver tube to guide the elongated pin into another aperture. Then the elongated pin may be placed in a locked position to secure the immobilizer device to the wheel.

18 Claims, 8 Drawing Sheets

(56) References Cited

U.S. PATENT DOCUMENTS 8,047,029 B1 * 11/2011 Henry .................. B60R 25/093
    70/14

* cited by examiner

IMMOBILIZER DEVICE FOR A WHEEL

CROSS REFERENCE TO RELATED APPLICATIONS

This application claims priority under 35 U.S.C. § 119 (e) to U.S. Provisional Patent Application Ser. No. 62/186,802 filed Jun. 30, 2015, which is incorporated herein by reference in its entirety.

FIELD OF THE INVENTION

The invention relates to a device and method for selectively immobilizing wheeled vehicles or aircraft to inhibit theft or the unauthorized movement thereof.

BACKGROUND OF THE INVENTION

The use of immobilizer devices to prevent the unauthorized movement of automobiles, aircraft and other wheeled vehicles is well known. Immobilizer devices are designed to prevent theft, ensure the payment of parking fines, or prevent travel during storms for aircraft. Vehicle immobilizer devices are widely used by law enforcement personnel, parking attendants, city governments, and individuals concerned with the theft of vehicles. Unfortunately, the vehicle immobilizer devices currently known in the art are difficult to install, may cause vehicle damage, are prone to being removed by unauthorized personnel, and are not versatile for use on a variety of vehicles and wheel assemblies.

One problem associated with many vehicle immobilizer designs is the ease of which they can be removed by irate vehicle owners or thieves. This ease of removal is often attributed to inadequate contact between the immobilizer and the vehicle wheel assembly. Specifically, clamshell designs simply clamp into place, or other designs have inner fingers contact select portions of the vehicle wheel assembly.

As used herein, the term "vehicle wheel assembly" is generally defined as a vehicle wheel with or without a hubcap, an interconnected tire, a brake mechanism, a wheel rim, and in some vehicle designs, tie rods that are employed for support and/or steering purposes. The brake mechanism may further include a drum or disk brake with, or without, a brake backing plate. Without adequate points of contact, the immobilizer device may be pried, cut and/or pulled off the vehicle. For example, immobilizer disengagement may be achieved by a release of tire pressure, thereby altering the wheel assembly/immobilizer interface and allowing the device to be removed from the wheel assembly. Devices disclosed in U.S. Pat. No. RE024,712 to Maruggand and U.S. Pat. No. 2,960,857 to Winter, which are incorporated herein by reference in their entireties, both employ only three points of engagement on the vehicle wheel assembly, which is generally insufficient to prevent unauthorized removal.

Another problem associated with many types of vehicle immobilizer devices is the difficulty associated with installation and removal. This is generally due to the device's weight and the fact that the inner and outer arm assemblies that engage the wheel assembly must be precisely positioned in a very limited space. Thus, proper installation of the device is time consuming and often performed improperly, resulting in vehicle wheel assembly damage or easier unauthorized removal. For example, U.S. Pat. No. 5,865,048, to Beavers et al., which is incorporated herein by reference in its entirety, teaches a wheel immobilizer that includes an inner arm and stopping member that are adapted to selectively interconnect to a wheel and a brake backing plate.

In order to ensure proper placement, a user must physically reach in between the wheel and the brake backing plate to feel where a wheel lip is located in order to properly align the stopping member prior to the final installation step of tightening a locking bolt.

Yet another problem associated with many types of vehicle immobilizer devices is damage to the vehicle inner wheel, outer wheel, wheel rims, hubcaps and/or braking mechanisms that may occur during installation. The damage to the hubcap and or outer wheel rim is the result of force and associated abrasion from a rigid metallic plate or arm assembly that is pressed against the hubcap or outer wheel. Any prying or movement of the arm assembly that may often occur during installation or attempts to forcibly remove the immobilizer device from the vehicle will permanently scratch and/or dent the hubcap or outer wheel. The outer and inner wheel rims may also be damaged by many types of vehicle immobilizer devices as a result of the rigid, non-moving rim jaws that engage the inner or outer rim, as shown in U.S. Pat. No. 2,960,857 to Winter, which is incorporated herein by reference in its entirety. Any prying of the vehicle immobilizer device may result in the rims becoming bent or scratched. Furthermore, since rim jaws are not capable of moving in a longitudinal and/or horizontal direction, the vehicle immobilizer device cannot be properly fitted to numerous types and sizes of wheel assemblies, thus resulting in inadequate installation.

Another problem associated with many vehicle immobilizer devices is a lack of versatility for use on a variety of models of wheel assemblies and automobiles. More specifically, even for a certain size or model of vehicle, many immobilizer devices cannot be used interchangeably on both vehicle sides. Thus, installers must have numerous models of immobilizer devices in stock for a variety of vehicles rather than utilize a versatile, universal immobilizer device capable of use on a variety of vehicles and wheel assemblies.

SUMMARY OF THE INVENTION

It is thus an aspect of embodiments of the invention to provide an immobilizer device that is difficult to tamper with and forcibly remove from a vehicle wheel assembly. It is a further aspect of embodiments of the invention to provide an immobilizer device that is easy to place on a wide variety of vehicle wheel assemblies. It is also an aspect of embodiments of the invention to provide an immobilizer device that is less likely to damage portions of the vehicle wheel assembly.

It is an aspect of some embodiments of the invention to provide an immobilizer device that has a selectively removable elongated pin that passes through a portion of the vehicle wheel assembly. The main frame of the immobilizer device may have first and second arms, and an elongated pin passes through the first arm, through a portion of the vehicle wheel assembly, and through the second arm before being secured in place. Thus, the main frame of the immobilizer device and the elongated pin form a fully circumscribed perimeter that passes through a portion of the vehicle wheel assembly, for example, a cutout portion of a wheel rim. This aspect of the invention makes unauthorized removed extremely difficult since basic prying techniques would fail. An unauthorized person would have to saw through a portion of the immobilizer device to remove the immobilizer device.

It is another aspect of embodiments of the invention to provide an immobilizer device that may serve as a chock or a wedge to prevent movement of a wheel or vehicle wheel assembly. The main frame of the immobilizer device may become wedged between the tire of a vehicle wheel assembly and the ground surface. Thus, if a driver attempts to drive with the immobilizer device secured to a vehicle wheel assembly, the tire will not turn. Similarly, the immobilizer device may prevent tire rotation in the opposite direction. The elongated pin may pass through the wheel rim and interfere with other portions of the vehicle wheel assembly such as the brake calipers to prevent the driver from traveling in the opposite direction.

It is yet another aspect of embodiments of the invention to provide an immobilizer device that has a receiver tube located on the outer surface of the immobilizer device's outer arm, i.e., the arm on the outside of the wheel. The receiver tube may be positioned over an aperture that passes through the immobilizer device's outer arm. The receiver tube may be configured to receive an elongated pin and a flange disposed on one end of the elongated pin. In some embodiments, the flange is retained inside the receiver tube, which may be locked to secure the elongated pin in a locked state. The receiver tube prevents tampering with one end of the elongated pin.

It is one aspect of embodiments of the invention to provide an immobilizer device that has an indexing feature positioned on an inner surface of the immobilizer device's inner arm, i.e., the arm behind the wheel. The indexing feature may be positioned over an aperture that passes through the immobilizer device's inner arm. As the elongated pin passes through the receiver tube and the aperture in the immobilizer device's outer arm, the elongated pin generally travels toward the aperture disposed on the immobilizer device's inner arm. The indexing feature receives the distal end of the elongated pin, even if the pin is not directly located over the inner arm's aperture. The indexing feature then guides the distal end of the elongated pin into the aperture on the inner arm of the immobilizer device. In some embodiments, the indexing feature has a frusto-conical shape that channels the distal end of the elongated pin into the aperture. This aspect is particularly useful since the immobilizer device's inner arm is often out of sight behind the vehicle wheel assembly and difficult to operate. Thus, a user does not have to physically reach behind the vehicle wheel or wheel well when operating the elongated pin.

It is another aspect of embodiments of the invention to provide an immobilizer device comprised of various materials and coatings. For example, in some embodiments, the elongated pin is constructed from stainless steel. However, it will be appreciated that other embodiments of the invention may have an elongated pin made from a different material. Similarly, embodiments of the invention may have an immobilizer device that has a rust-proof coating such as Safe Orange that resists environmental elements.

One particular embodiment of the invention is a system for immobilizing a wheel assembly, comprising a wheel assembly having a wheel aperture; an immobilizer device, comprising an outer arm having a distal end; an inner arm having a distal end, wherein the inner arm and the outer arm are substantially parallel; a first aperture positioned near the distal end of the outer arm; a second aperture positioned near the distal end of the inner arm, wherein the first aperture and the second aperture are substantially aligned along a common axis; an indexing feature positioned over the second aperture on an inner surface of the inner arm; and an elongated pin; wherein the elongated pin is configured to pass through the first aperture, pass through the wheel aperture, and contact the indexing feature, which guides the elongated pin into the second aperture, wherein the outer arm, the inner arm, and the elongated pin form a continuous structure through the wheel aperture of the wheel assembly.

In some embodiments, the immobilizer device may comprise a receiver tube positioned over the first aperture on an outer surface of the outer arm, and the receiver tube defining a partially enclosed volume such that the flange is configured to pass into the partially enclosed volume of the receiver tube and not pass into the first aperture. In various embodiments, a diameter of the flange may be larger than a diameter of the first aperture and smaller than an inner diameter of the partially enclosed volume. In some embodiments, the receiver tube may comprise a third aperture and a fourth aperture, wherein a locking feature is configured to pass through the third and fourth apertures to maintain the flange in the partially enclosed volume of the receiver tube.

The indexing feature and system of the immobilizer device may have several different configurations. For example, in various embodiments, the indexing feature may comprise a receiving surface having a frusto-conical shape. In some embodiments, a diameter of the elongated pin may be smaller than a diameter of the first aperture such that the elongated pin has a maximum deflection angle relative to the immobilizer device, wherein the maximum deflection angle defines a contact area on the inner arm for the elongated pin, the contact area positioned around the second aperture and on the inner surface of the inner arm, and a cross-sectional area of the indexing feature is larger than the contact area. In various embodiments, the indexing feature may extend from the inner surface of the inner arm towards the outer arm.

In some embodiments, the elongated pin may be configured to pass through the second aperture. In various embodiments, the immobilizer device may further comprise a cross arm interconnected to the outer arm and the inner arm, wherein the cross arm is perpendicular to the outer arm and the inner arm; and at least one strap interconnected to the outer arm and the inner arm, wherein the at least one strap is perpendicular to the outer arm and the inner arm.

In another particular embodiment, the method of immobilizing a wheel assembly, comprising (i) providing a wheel assembly having a wheel aperture; (ii) providing an immobilizer device having an outer arm with a distal end and an inner arm with a distal end; (iii) passing an elongated pin through a receiver tube positioned on an outer surface of the outer arm; (iv) passing the elongated pin through a first aperture positioned proximate to the distal end of the outer arm; (v) passing the elongated pin through the wheel aperture of the wheel assembly; (vi) passing the elongated pin into a second aperture positioned proximate to the distal end of the inner arm; and (vii) securing the elongated pin in the receiver tube such that the immobilizer device forms a perimeter through the wheel assembly.

In some embodiments of the invention, the method may further comprise (viii) contacting the elongated pin with an indexing feature positioned over the second aperture on an inner surface of the inner arm; and (ix) guiding, by the indexing feature, the elongated pin into the second aperture. In various embodiments, the indexing feature may have a frusto-conical shape. In some embodiments, the method may further comprise (x) providing a flange on a trailing end of the elongated pin, wherein the flange has a diameter that is greater than a diameter of the first aperture and less than an inner diameter formed by the receiver tube such that the flange passes into the receiver tube and does not pass into the first aperture. In various embodiments, the method may further comprise (xi) defining, by the receiver tube, a partially enclosed volume having the inner diameter; and (xii) obstructing the partially enclosed volume with a locking feature after the flange passes into the receiver tube to secure the elongated pin in the receiver tube. In some embodiments, the method may further comprise (xiii) providing a third aperture and a fourth aperture in the receiver tube, wherein the third aperture and the fourth aperture are substantially aligned along a common axis; and (xiv) passing a shackle of the locking feature through the third aperture and the fourth aperture to obstruct the partially enclosed volume defined by the receiver tube.

In various embodiments of the invention, the method may further comprise (xv) providing a lock guard; and (xvi) passing a shackle of the locking feature through the lock guard when obstructing the partially enclosed volume with the locking feature, wherein the lock guard covers at least one surface of the locking feature to prevent tampering with the locking feature. In some embodiments, the method may further comprise (xvii) providing a maximum deflection angle of the elongated pin relative to the immobilizer device, the maximum deflection angle formed by a diameter of the elongated pin that is less than a diameter of the first aperture; and (xviii) providing a contact area on the inner arm for the elongated pin as the elongated pin passes through the wheel assembly and into the second aperture, wherein the contact area is defined by the maximum deflection angle, and the indexing feature has a cross-sectional area that is larger than the contact area. In various embodiments, the frusto-conical shape of the indexing feature may project from the inner surface of the inner arm towards the outer arm.

Yet another particular embodiment of the invention is an immobilizer device for immobilizing a wheel assembly, comprising an outer arm having a distal end; a first aperture positioned near the distal end of the outer arm; a receiver tube positioned over the first aperture on an outer surface of the outer arm; an inner arm having a distal end, wherein the inner arm and the outer arm are substantially parallel; a second aperture positioned near the distal end of the inner arm; an indexing feature positioned over the second aperture on an inner surface of the inner arm, the indexing feature extending from the inner arm towards the outer arm; a cross arm interconnected to the outer arm and the inner arm, wherein the cross arm is substantially perpendicular to the outer arm and the inner arm, and wherein the cross arm forms a chock; and an elongated pin, wherein the elongated pin is configured to pass through the first aperture, pass through the wheel aperture, and contact the indexing feature, which guides the elongated pin into the second aperture, wherein the outer arm, the inner arm, the cross arm, and the elongated pin are configured to form a continuous ring through a wheel aperture of a wheel assembly. In some embodiments, the immobilizer device may further comprise a flange positioned on an end of the elongated pin, wherein a cross-sectional area of the flange is larger than a cross-sectional area of the first aperture and smaller than a cross-sectional area of the receiver tube such that the flange is configured to pass into the partially enclosed volume of the receiver tube and not pass into the first aperture.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the invention. Moreover, references made herein to "the invention" or aspects thereof should be understood to mean certain embodiments of the invention and should not necessarily be construed as limiting all embodiments to a particular description. The invention is set forth in various levels of detail in the Summary of the Invention as well as in the attached drawings and Detailed Description and no limitation as to the scope of the invention is intended by either the inclusion or non-inclusion of elements, components, etc. in this Summary of the Invention. Additional aspects of the invention will become more readily apparent from the Detailed Description particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

Figure 1:
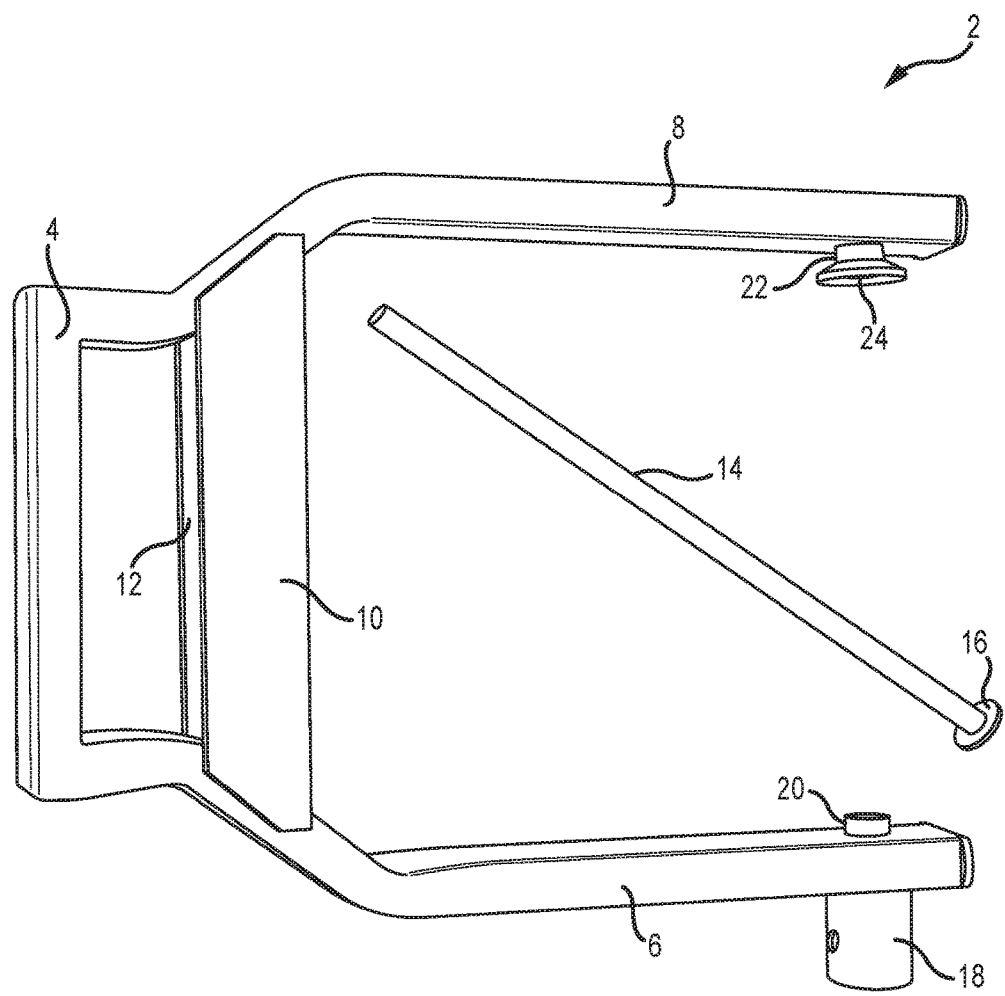
FIG. 1 is a top plan view of an immobilizer device with an elongated pin in accordance with various embodiments of the invention.

To assist in the understanding of the embodiments of the invention the following list of components and associated numbering found in the drawings is provided herein:

| Component No. | Component |
| --- | --- |
| 2 | Immobilizer Device |
| 4 | Cross Arm |
| 6 | Outer Arm |
| 8 | Inner Arm |
| 10 | First Strap |
| 12 | Second Strap |
| 14 | Elongated Pin |
| 16 | Flange |
| 18 | Receiver Tube |
| 20 | First Aperture |

-continued

| Component No. | Component |
|---|---|
| 22 | Indexing Feature |
| 24 | Second Aperture |
| 26 | Third Aperture |
| 28 | Lock Guard |
| 30 | Guard Body |
| 32 | Guard Guide |
| 34 | Fourth Aperture |
| 36 | Fifth Aperture |
| 38 | Lock Loop |
| 40 | Lock |
| 42 | Wheel |

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, and may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the invention are described herein and as depicted in the drawings. It is expressly understood that although the figures depict immobilizer devices, arms, receiver tubes, and indexing features, the invention is not limited to these embodiments.

Now referring to FIG. 1, a top plan view of an immobilizer device 2 with an elongated pin 14 is provided. The immobilizer device 2 has a cross arm 4 with an outer arm 6 and an inner arm 8 extending from the cross arm 4 at a substantially perpendicular angle. The arms 4, 6, 8 in this embodiment are made from 1" by 2" rectangular steel tube. However, it will be appreciated that the arms 4, 6, 8 may be made from different types of materials and/or different shapes. Further yet, it will be appreciated that the cross arm 4 is optionally removed in some embodiments such that the outer and inner arms 4, 6 are directly interconnected to each other. In the embodiment in FIG. 1, a first strap 10 and a second strap 12 are welded to the outer and inner arms 6, 8 to provide strength and increased rigidity to the immobilizer device 2.

An elongated pin 14 is provided wherein a flange 16 is positioned at one end of the elongated pin 14. In some embodiments, the elongated pin 14 is rigid, but in various embodiments the elongated pin 14 may be flexible to accommodate different vehicle wheel assemblies. The elongated pin 14 is configured to pass through a wheel rim or other feature and lock between the outer arm 6 and the inner arm 8. This configuration allows the cross arm 4 and the straps 10, 12 to serve as a chock to prevent the wheel from traveling.

A receiver tube 18 is positioned near a distal end of the outer arm 6. The receiver tube 18 is positioned on an outer surface of the outer arm 6 and positioned over a first aperture 20 that passes through the outer arm 6. The receiver tube 18 in this embodiment is a tubular cylinder that defines a partially enclosed volume. The inner surface of the cylinder, or alternatively the partially enclosed volume, may have a diameter that allows both the elongated pin 14 and the pin's flange 16 to pass through. However, the first aperture's 20 diameter may not permit the pin's flange 16 to pass through, and the flange 16 may be positioned within the partially enclosed volume of the receiver tube 18. This aspect of the interaction among the receiver tube 18, the elongated pin 16, the flange 16, and the first aperture 20 may be expressed in terms of cross-sectional area of the components or a maximum and minimum cross-sectional dimension of the components.

An indexing feature 22 is positioned near a distal end of the inner arm 8. The indexing feature 22 is positioned on an inner surface of the inner arm 8 and positioned over a second aperture 20 that passes through the inner arm 8. The indexing feature 22 is configured to receive a distal end of the elongated pin 14 (i.e., the end without the flange 16) and guide the elongated pin 14 into the second aperture 20.

Figure 2A:
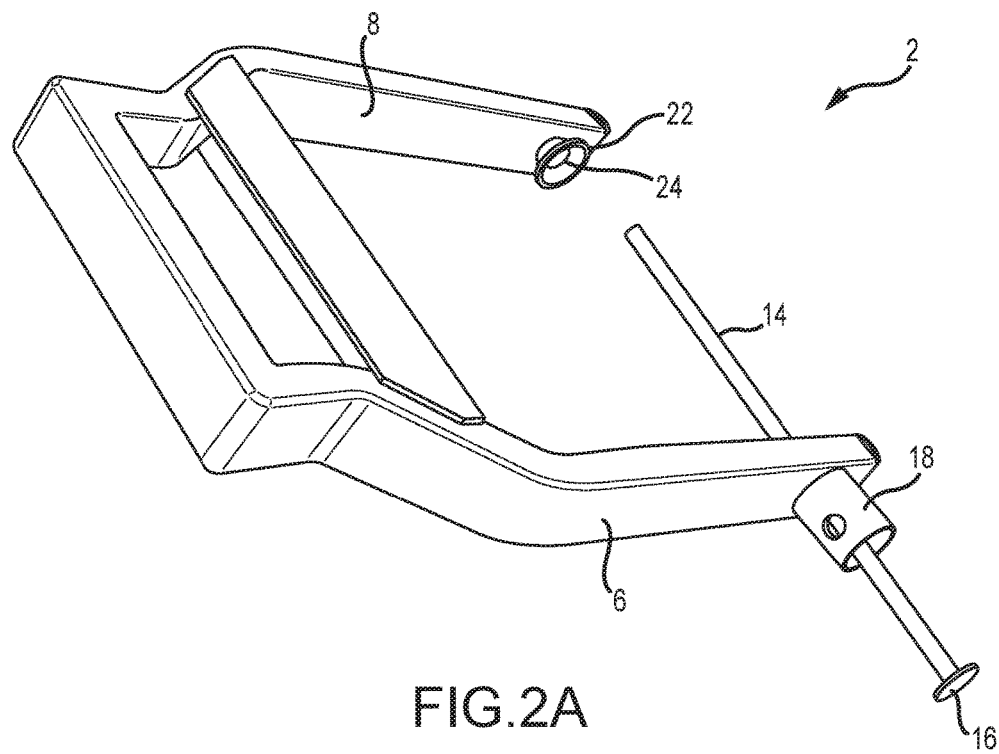
FIG. 2A is a perspective view of an immobilizer device with an elongated pin partially engaged in accordance with various embodiments of the invention.

Now referring to FIG. 2A, a perspective view of an immobilizer device 2 is provided. In this embodiment, an elongated pin 14 is passing through the first aperture of the outer arm 6, and a distal end of the elongated pin 14 is traveling toward the indexing feature 22 and the second aperture 24. As shown in this embodiment, the indexing feature 22 has a frusto-conical shape that guides the distal end of the elongated pin 14 into the second aperture 24, even if the distal end of the pin 14 is not aligned with the second aperture 24. During application of the immobilizer device 2, the indexing feature 22 allows a user to position the inner arm 8 behind the wheel and out of view from the user. Thus, the user does not need to visualize the alignment of the elongated pin 14 with the second aperture 24. The user simply needs to contact the indexing feature 22, which will then guide the distal end of the elongated pin 14 into the second aperture 24.

A contact area on an inner surface of the inner arm 8 may characterize the interaction between the unaligned elongated pin 14 and the indexing feature 22. The first and second apertures 20, 24 may, in some embodiments, be oriented along a common axis, and the elongated pin 14 has a longitudinal axis. If the diameter of the elongated pin 14 is less than the diameter of the first aperture, then the elongated pin 14 may deflect relative to the immobilizer device, specifically, the first aperture 20 of the outer arm 6. A maximum deflection angle between the longitudinal axis of the elongated pin 14 and the common axis between the aperture 20, 24 characterizes the furthest extent of this deflection. As the distal end of the elongated pin 14 passes through the first aperture 20, there are more and more possible locations where the distal end of the elongated pin 14 may be located. As a result, the maximum deflection angle of the elongated pin 14 defines a contact area on the inner surface of the inner arm 8, and the indexing feature 22 accounts for all possible contact points of the distal end of the elongated pin 14. Therefore, the cross-section area of the indexing feature 22 is larger than the contact area such that regardless of where the distal end of the elongated pin 14 contacts, the indexing feature 22 will channel and guide the distal end of the elongated pin 14 into the second aperture 24. Thus, the operator of the immobilizer device does not need to reach behind a wheel and manually guide an elongated pin since the indexing device satisfies this aspect of the immobilizer device operation.

It will be appreciated that if the indexing feature extends from an inner surface of the inner arm towards the outer arm, then the relevant contact area will be smaller than if the indexing feature is recessed from the inner surface of the inner arm. In either case, the cross-sectional area of the indexing feature is larger than the relevant contact area.

Various dimensions of an embodiment of the immobilizer device are provided. The immobilizer length is the length from the end of the cross arm 4 to the ends of the arms 6, 8; the immobilizer width is the span between the outer surfaces of the arms 6, 8; and the immobilizer height is the thickness of the arms 6, 8. In some embodiments, the immobilizer length is between approximately 10" and 40". In various embodiments, the immobilizer length is between approximately 15" and 25". In some embodiments, the immobilizer length is approximately 19.25". In some embodiments, the immobilizer width is between approximately 5" and 30". In various embodiments, the immobilizer width is between approximately 10" and 20". In some embodiments, the immobilizer width is approximately 16". In some embodiments, the immobilizer height is between approximately 0.5" and 6". In various embodiments, the immobilizer height is between approximately 1" and 3". In some embodiments, the immobilizer height is approximately 2". In some embodiments, the overall weight of the immobilizer device is approximately 10 lbs. In various embodiments, the size of the immobilizer device is 16¼" by 19¼" by 2½" with an inner opening area of 12⅛" by 13¾". The weight of the immobilizer device may be 10¾ lbs in some embodiments; the weight of the immobilizer device with a lock may be 11 lbs 10 oz in various embodiments; the weight of the immobilizer device with a lock guard may be 11 lbs 12 oz in some embodiments; and the weight of the immobilizer device with both a lock and a lock guard may be 12 lbs 12 oz in various embodiments.

Figure 2B:
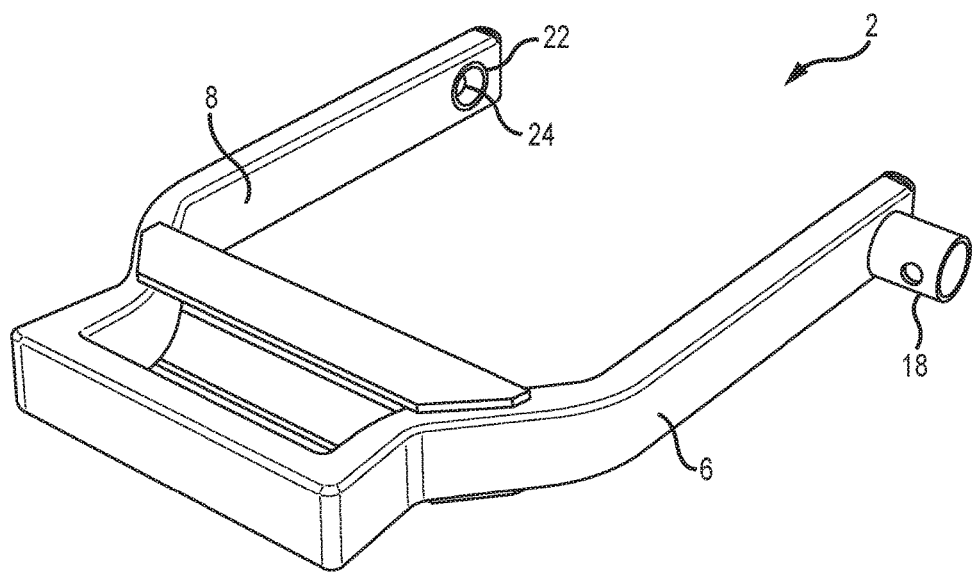
FIG. 2B is a perspective view of an immobilizer device wherein an indexing feature is integrated within an inner arm in accordance with various embodiments of the invention.

Now referring to FIG. 2B, another perspective view of an immobilizer device 2 is provided. In this embodiment, the indexing feature 22 is integrated into the inner arm 8 which means that the indexing feature 22 may not be located in the space between the inner arm 8 and the outer arm 6. The integrated indexing feature 22 also has a frusto-conical shape in this embodiment that guides the distal end of an elongated pin into the second aperture 24.

Figure 3:
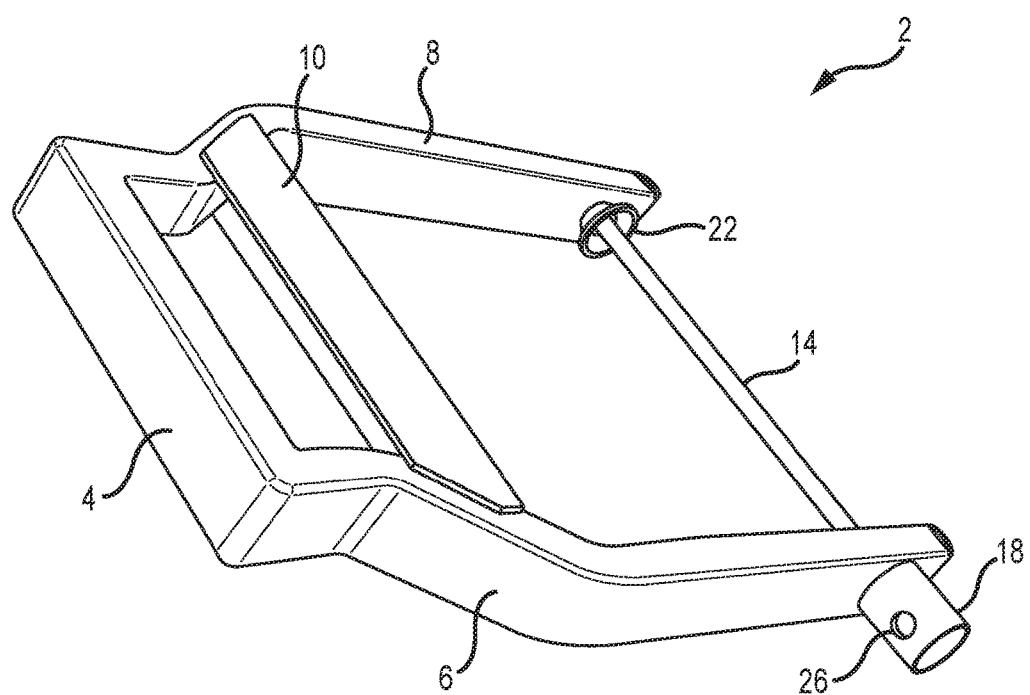
FIG. 3 is a perspective view of an immobilizer device with an elongated pin fully engaged in accordance with various embodiments of the invention.

Now referring to FIG. 3, an immobilizer device 2 is provided where an elongated pin 14 has passed through both a first aperture in the outer arm 6 and a second aperture in the inner arm 8. In some embodiments, the distal end of the elongated pin 14 extends through the second aperture 24 in the inner arm 8 such that the distal end of the elongated pin 14 is exposed on an outer surface of the inner arm 8. It will be appreciated that in some embodiments, the second aperture 24 is a recess such that the indexing feature 22 guides the distal end of the elongated feature 14 into the second aperture 24, but the distal end of the elongated feature 14 does not pass through the inner arm 8. When applied to a wheel, the elongated pin 14 is passed through a portion of the wheel, and the cross arm 4 and straps 10, 12 are positioned outside of the wheel's circumference. The cross arm 4 and straps 10, 12 serve as a chock to prevent the wheel from traveling.

Also shown in FIG. 3 is a third aperture 26 in the receiver tube 18. Another aperture may be provided on the other side of the receiver tube 18. These apertures provide a location for a locking feature such as a padlock or other locking device. Once the elongated pin's flange 16 is positioned within the partially enclosed volume of the receiver tube 18, a shackle of the padlock may pass through the apertures and obstruct the partially enclosed volume to hold the elongated pin 14 and its flange 16 in a locked position. Once the obstruction is removed from the partially enclosed volume, and the pin 14 and flange 16 may be removed from the partially enclosed volume of the receiver tube 18, and the elongated pin 14 is in an open position.

It will be appreciated that a padlock is not the only device that may obstruct the partially enclosed volume of the receiver tube 18. For example, plugs, bolts, chains, tabs, magnets, or any other similar device may obstruct the partially enclosed volume of the receiver tube 18. Further yet, other devices may be used to secure the elongated pin 14 in an open position. For example, a hinged door may rotate to cover the end of the receiver tube 18 to secure the elongated pin 14 in an open position.

In the embodiment in FIG. 3, it is difficult to forcibly remove the elongated pin 14. A cylindrical shape and containment in the receiver tube 18 allows the elongated pin 14 to freely rotate. Thus, if a person tries to forcibly remove the immobilizer device 2 by, for example, sawing off the elongated pin 14, it will prove exceedingly difficult because the elongated pin 14 can freely rotate with each cut stroke of a hack saw or any other hand-held saw.

Figure 4A:
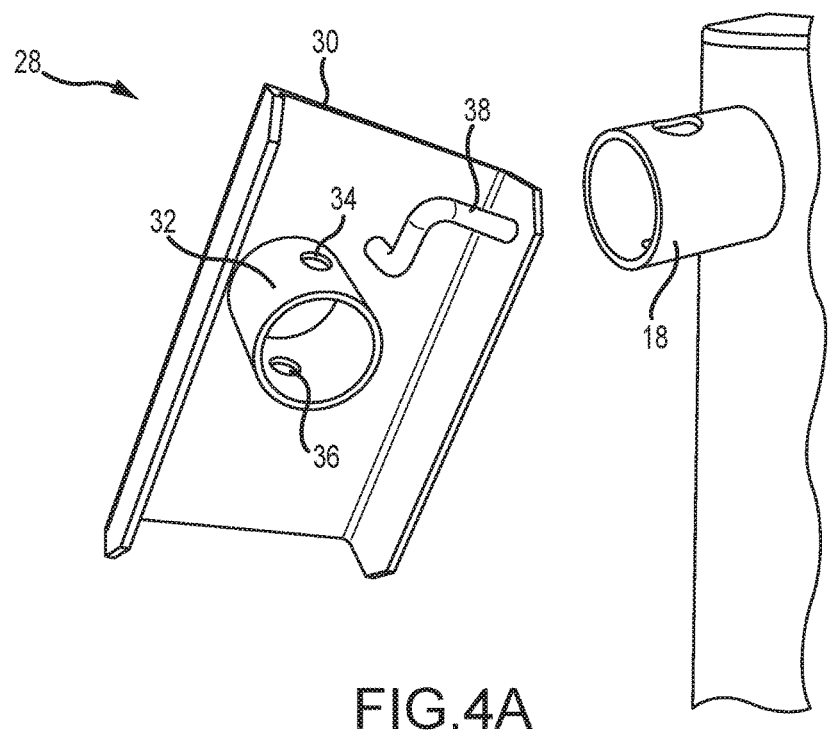
FIG. 4A is a perspective view of a lock guard mechanism in accordance with various embodiments of the invention.
Figure 4B:
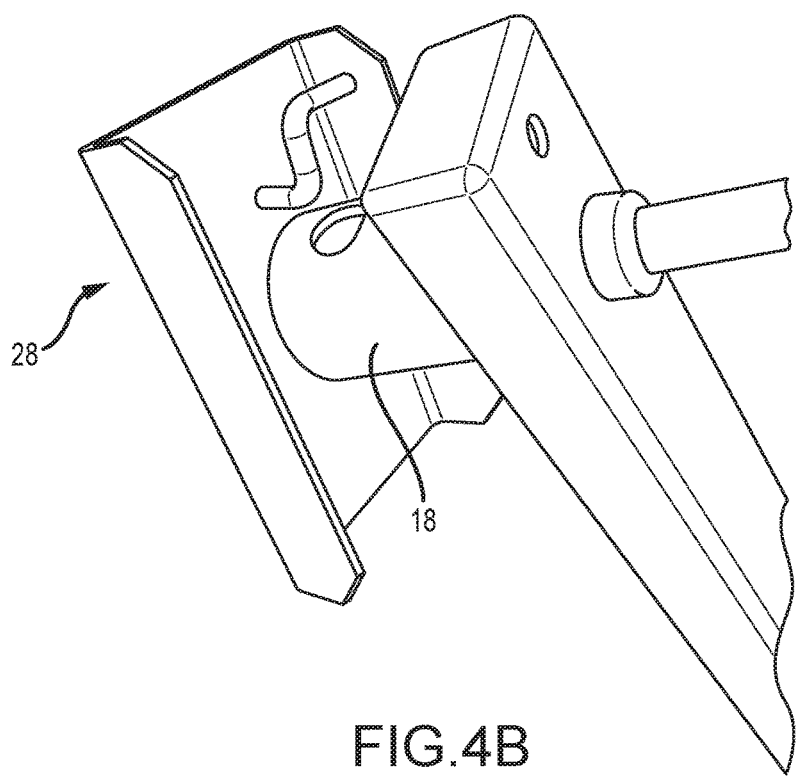
FIG. 4B is a perspective view of a lock guard engaging a guiding feature of an immobilizer device in accordance with various embodiments of the invention.
Figure 4C:
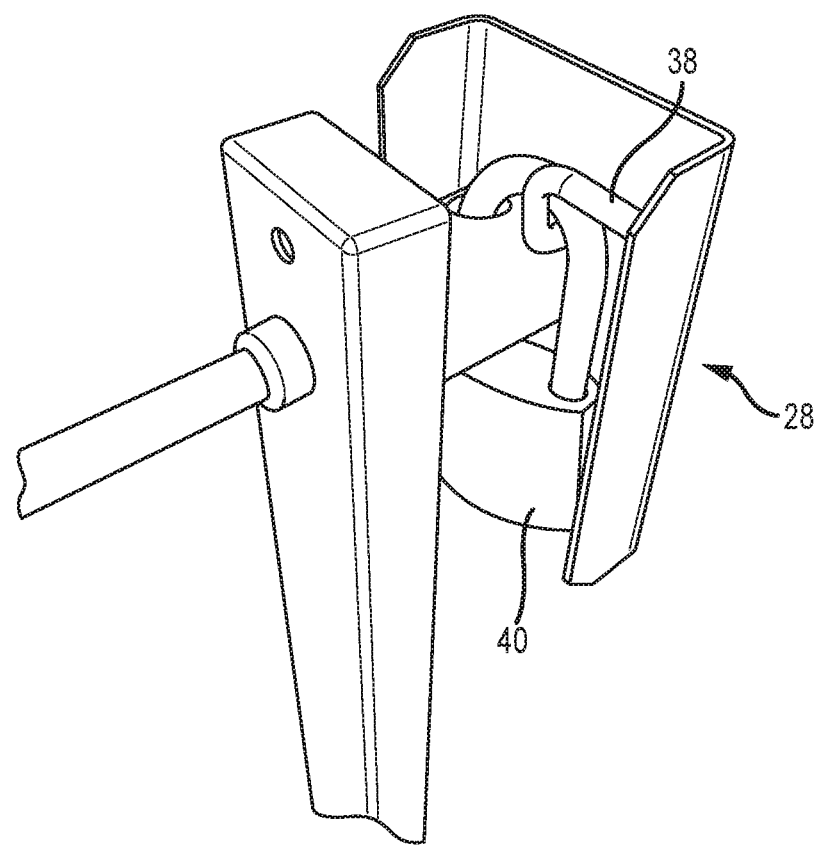
FIG. 4C is a perspective view of a lock guard that is locked onto a guiding feature of an immobilizer device in accordance with various embodiments of the invention.

Now referring to FIGS. 4A-4C, a lock guard 28 is provided to help prevent a third party from tampering with the immobilizer device once the receiver tube 18 is obstructed and the elongated pin 14 and its flange 16 are in a locked position. The lock guard 28 shown in FIG. 4A has a guard body 30 that comprises a planar surface and two sidewalls extending perpendicularly from the planar surface. The guard body 30 defines a partially enclosed volume. Next, the lock guard 28 has a guard guide 32 that extends upward from the planar surface of the guard body 30. The guard guide 32 in this embodiment is configured to fit into the immobilizer device's receiver tube 18. Accordingly, the guard guide 32 comprises a fourth aperture 34 and a fifth aperture 36 wherein these apertures 34, 36 correspond to the apertures on the receiver tube 18 such that a pad lock or other locking device may pass through both the receiver tube 18 and the guard guide 32 to place the elongated pin 14 and its flange 16 in a locked position. The lock guard 28 also has a lock loop 38 that extends from one sidewall of the guard body 30 to the planar surface of the guard body 30.

Now referring to FIG. 4B, the lock guard 28 and its guard guide are being positioned in the immobilizer device's receiver tube 18. In this embodiment, the guard guide fits within the receiver tube 18. However, it will be appreciated that in other embodiments the guard guide may fit over the receiver tube 18, partially over and/or partially in the receiver tube 18, or any other variation of interface between the guard guide and the receiver tube 18.

Now referring to FIG. 4C, the shackle of a lock 40 is passed through the lock loop 38 and the apertures of the immobilizer device's receiver tube 18 and the apertures of the guard guide 32. The lock guard 28 and its various features including the guard body 30 and the lock loop 38 make it difficult to extend a tool toward the lock 40 to disable the lock. For example, the lock guard 28 prevents bolt cutters and hack saws from reaching critical portions of the lock 40 such as the shackle of the lock 40. An exemplary lock guard 28 is the Rhino LC-3 Lock Cover, and an exemplary lock 40 is the Rhino BP-M1 Padlock.

Figure 5:
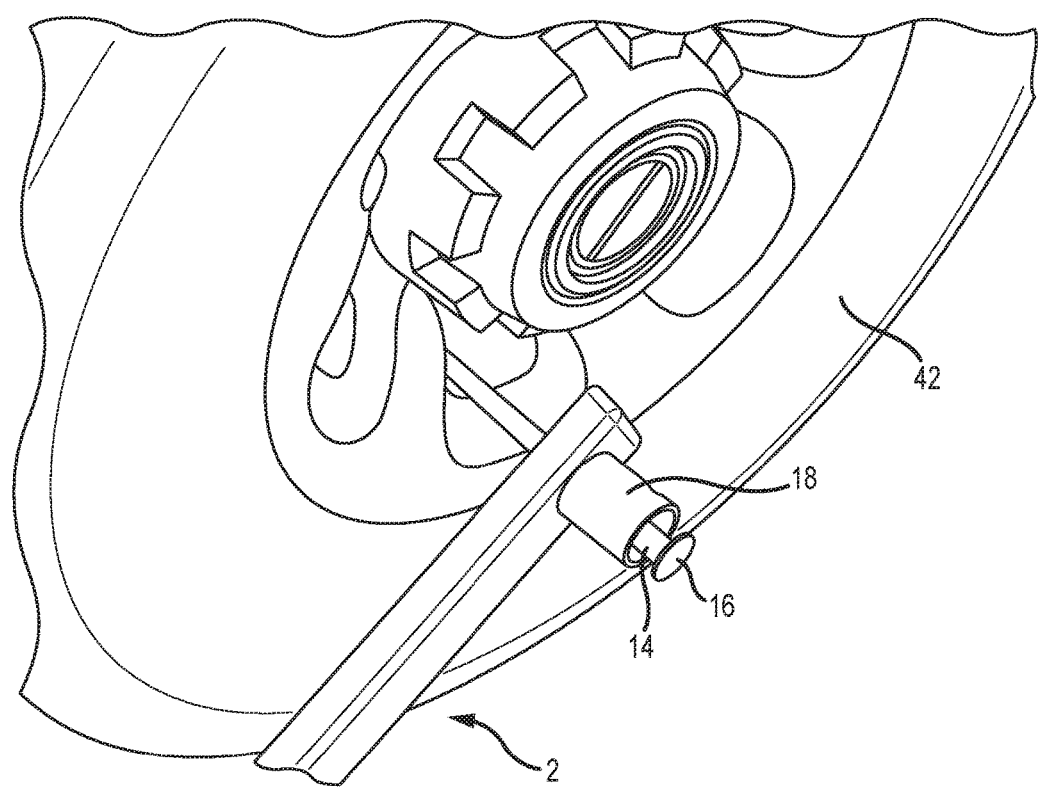
FIG. 5 is a perspective view of an immobilizer device's outer arm being installed on a vehicle's wheel in accordance with various embodiments of the invention.

Now referring to FIG. 5, a perspective view of an immobilizer device 2 being installed onto a wheel 42 is provided. As shown, an outer arm of the immobilizer device 2 is positioned near the wheel's 42 rim. Then, an elongated pin 14 is passed through a receiver tube 18, an aperture in the immobilizer device's 2 outer arm, and a gap or space in the wheel's 42 rim such that the elongated pin 14 emerges on the other side of the wheel 42. The elongated pin 14 has a flange 16 disposed on one end of the elongated pin 14 where the flange 16 passes through the receiver tube 18 but not the aperture in the immobilizer device's 2 outer arm.

Figure 6:
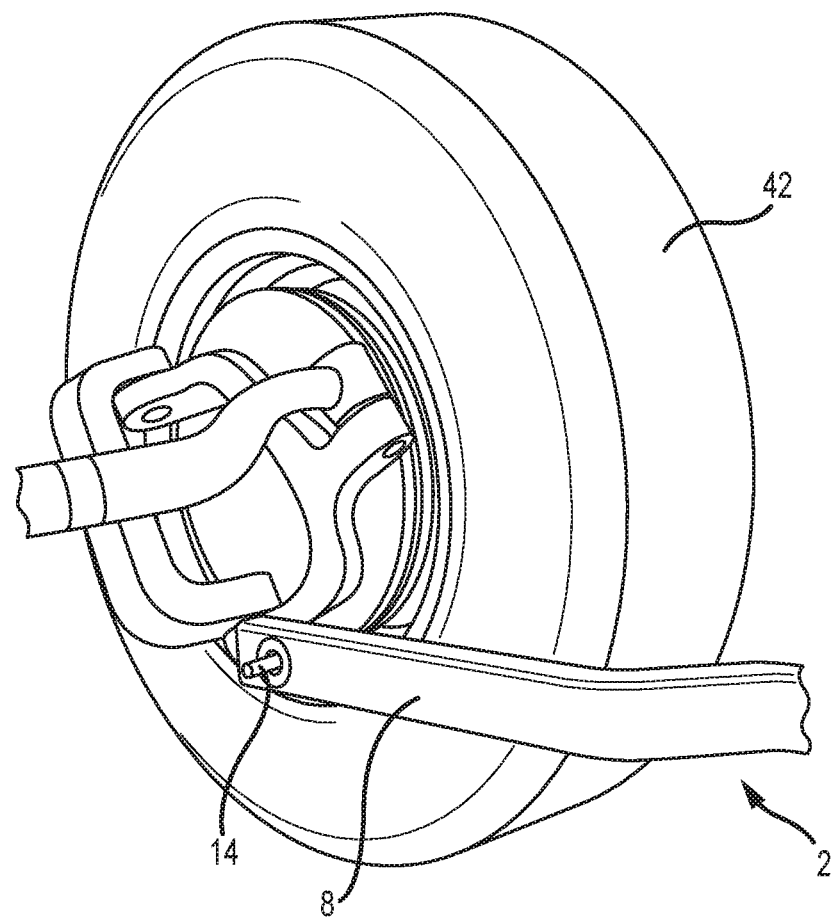
FIG. 6 is a perspective view of an immobilizer device's inner arm being installed on a vehicle's wheel in accordance with various embodiments of the invention.

Now referring to FIG. 6, a perspective view of an immobilizer device's 2 inner arm positioned proximate to the rim of a wheel 42 is provided. The elongated pin 14 described in reference to FIG. 5 has passed through a gap or space in the wheel's 42 rim and into the inner arm of the immobilizer device 2. Thus, the immobilizer device 2 forms a complete perimeter through the wheel 42.

Figure 7:
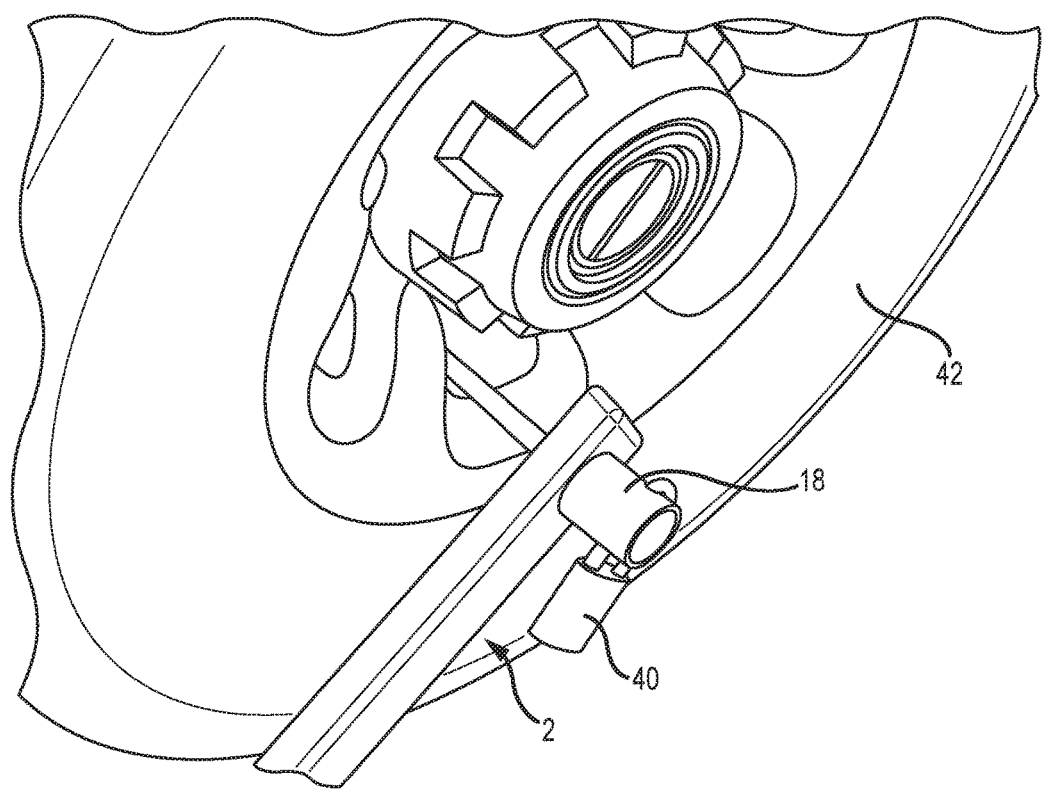
FIG. 7 is a perspective view of an immobilizer device being locked on a vehicle's wheel in accordance with various embodiments of the invention.

Now referring to FIG. 7, the end of the elongated pin 14 that has the flange 16 has passed into the receiver tube 18 but not through the aperture in the immobilizer device's 2 outer arm. A lock 40 is placed through apertures in the receiver tube 18 to obstruct the partially enclosed volume within the receiver tube 18 such that the flange 16 on the elongated pin 14 cannot be removed from the receiver tube 18. Therefore, the elongated pin 14 is secured in place through the immobilizer device's outer arm, a gap or space in the wheel's 42 rim, and the immobilizer device's inner arm.

When the immobilizer device 2 is secured to the wheel 42 of a vehicle, the immobilizer device 2 forms a complete perimeter through the wheel 42. The vehicle cannot move forward or backward because of the immobilizer device 2. If the vehicle attempts to move forward, the immobilizer device 2 functions as a chock. If the vehicle attempts to move backward, the immobilizer device 2 interferes with other components of the vehicle such as the axle, the brake system, control arms, etc. This prevents the vehicle from traveling backward, and thus the vehicle is rendered immobile.

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed.

The phrases "at least one", "one or more", and "and/or", as used herein, are open-ended expressions that are both conjunctive and disjunctive in operation. For example, each of the expressions "at least one of A, B, and C", "at least one of A, B, or C", "one or more of A, B, and C", "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having," and variations thereof, is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials, or acts, and the equivalents thereof, shall include all those described in the summary of the invention, brief description of the drawings, detailed description, abstract, and claims themselves.

The foregoing description of the invention has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Consequently, variations and modifications commensurate with the above teachings and skill and knowledge of the relevant art are within the scope of the invention. The embodiments described herein above are further intended to explain best modes of practicing the invention and to enable others skilled in the art to utilize the invention in such a manner, or include other embodiments with various modifications as required by the particular application(s) or use(s) of the invention. Thus, it is intended that the claims be construed to include alternative embodiments to the extent permitted by the prior art.

What is claimed is:

1. A system for immobilizing a wheel assembly, comprising:
   a wheel assembly having a wheel aperture;
   an immobilizer device, comprising:
      an outer arm having a distal end;
      an inner arm having a distal end, wherein said inner arm and said outer arm are substantially parallel;
      a first aperture positioned near said distal end of said outer arm;

a second aperture positioned near said distal end of said inner arm, wherein said first aperture and said second aperture are substantially aligned along a common axis;

an indexing feature positioned over said second aperture on an inner surface of said inner arm, wherein said indexing feature extends from said inner surface of said inner arm towards said outer arm;

an elongated pin, wherein said elongated pin is configured to pass through said first aperture, pass through said wheel aperture, and contact said indexing feature, which guides said elongated pin into said second aperture, wherein said outer arm, said inner arm, and said elongated pin form a continuous structure through said wheel aperture of said wheel assembly; and a receiver tube positioned over said first aperture on an outer surface of said outer arm, and said receiver tube defining a partially enclosed volume such that a flange of said elongated pin is configured to pass into said partially enclosed volume of said receiver tube and not pass into said first aperture.

2. The system of claim 1, wherein a diameter of said flange is larger than a diameter of said first aperture and smaller than an inner diameter of said partially enclosed volume.

3. The system of claim 1, wherein said receiver tube comprises a third aperture and a fourth aperture, wherein a locking feature is configured to pass through said third and fourth apertures to maintain said flange in said partially enclosed volume of said receiver tube.

4. The system of claim 1, wherein said indexing feature comprises a receiving surface having a frusto-conical shape.

5. The system of claim 1, wherein a diameter of said elongated pin is smaller than a diameter of said first aperture such that said elongated pin has a maximum deflection angle relative to said immobilizer device, wherein said maximum deflection angle defines a contact area on said inner arm for said elongated pin, said contact area positioned around said second aperture and on said inner surface of said inner arm, and a cross-sectional area of said indexing feature is larger than said contact area.

6. The system of claim 1, wherein said elongated pin is configured to pass through said second aperture.

7. The system of claim 1, further comprising:
a cross arm interconnected to said outer arm and said inner arm, wherein said cross arm is perpendicular to said outer arm and said inner arm; and
at least one strap interconnected to said outer arm and said inner arm, wherein said at least one strap is perpendicular to said outer arm and said inner arm.

8. A method of immobilizing a wheel assembly, comprising:
providing a wheel assembly having a wheel aperture;
providing an immobilizer device having an outer arm with a distal end and an inner arm with a distal end;
passing an elongated pin through a receiver tube positioned on an outer surface of said outer arm;
passing said elongated pin through a first aperture positioned proximate to said distal end of said outer arm;
passing said elongated pin through said wheel aperture of said wheel assembly;
passing said elongated pin into a second aperture positioned proximate to said distal end of said inner arm; and
securing said elongated pin in said receiver tube such that said immobilizer device forms a perimeter through said wheel assembly.

9. The method of claim 8, further comprising:
contacting said elongated pin with an indexing feature positioned over said second aperture on an inner surface of said inner arm; and
guiding, by said indexing feature, said elongated pin into said second aperture.

10. The method of claim 9, wherein said indexing feature has a frusto-conical shape.

11. The method of claim 8, further comprising:
providing a flange on a trailing end of said elongated pin, wherein said flange has a diameter that is greater than a diameter of said first aperture and less than an inner diameter formed by said receiver tube such that said flange passes into said receiver tube and does not pass into said first aperture.

12. The method of claim 11, further comprising:
defining, by said receiver tube, a partially enclosed volume having said inner diameter; and
obstructing said partially enclosed volume with a locking feature after said flange passes into said receiver tube to secure said elongated pin in said receiver tube.

13. The method of claim 12, further comprising:
providing a third aperture and a fourth aperture in said receiver tube, wherein said third aperture and said fourth aperture are substantially aligned along a common axis; and
passing a shackle of said locking feature through said third aperture and said fourth aperture to obstruct said partially enclosed volume defined by said receiver tube.

14. The method of claim 12, further comprising:
providing a lock guard; and
passing a shackle of said locking feature through said lock guard when obstructing said partially enclosed volume with said locking feature, wherein said lock guard covers at least one surface of said locking feature to prevent tampering with said locking feature.

15. The method of claim 9, further comprising:
providing a maximum deflection angle of said elongated pin relative to said immobilizer device, said maximum deflection angle formed by a diameter of said elongated pin that is less than a diameter of said first aperture; and
providing a contact area on said inner arm for said elongated pin as said elongated pin passes through said wheel assembly and into said second aperture, wherein said contact area is defined by said maximum deflection angle, and said indexing feature has a cross-sectional area that is larger than said contact area.

16. The method of claim 10, wherein said frusto-conical shape of said indexing feature projects from said inner surface of said inner arm towards said outer arm.

17. An immobilizer device for immobilizing a wheel assembly, comprising:
an outer arm having a distal end;
a first aperture positioned near said distal end of said outer arm;
a receiver tube positioned over said first aperture on an outer surface of said outer arm;
an inner arm having a distal end, wherein said inner arm and said outer arm are substantially parallel;
a second aperture positioned near said distal end of said inner arm;

an indexing feature positioned over said second aperture on an inner surface of said inner arm, said indexing feature extending from said inner arm towards said outer arm;

a cross arm interconnected to said outer arm and said inner arm, wherein said cross arm is substantially perpendicular to said outer arm and said inner arm, and wherein said cross arm forms a chock; and an elongated pin, wherein said elongated pin is configured to pass through said first aperture, pass through a wheel aperture of a wheel assembly, and contact said indexing feature, which guides said elongated pin into said second aperture, wherein said outer arm, said inner arm, said cross arm, and said elongated pin are configured to form a continuous ring through a wheel aperture of a wheel assembly.

18. The immobilizer device of claim 17, further comprising:

a flange positioned on an end of said elongated pin, wherein a cross-sectional area of said flange is larger than a cross-sectional area of said first aperture and smaller than a cross-sectional area of said receiver tube such that said flange is configured to pass into a partially enclosed volume of said receiver tube and not pass into said first aperture.

* * * * *